US008716598B2

(12) United States Patent
Pan

(10) Patent No.: US 8,716,598 B2
(45) Date of Patent: May 6, 2014

(54) CASE FOR HOUSING AND PROTECTING AN ELECTRONIC DEVICE

(75) Inventor: Yichuan Pan, San Diego, CA (US)

(73) Assignee: Octo Products LLC, San Diego, CA (US)

( * ) Notice: Subject to any disclaimer, the term of this patent is extended or adjusted under 35 U.S.C. 154(b) by 96 days.

(21) Appl. No.: 13/592,904

(22) Filed: Aug. 23, 2012

(65) Prior Publication Data

US 2014/0055014 A1    Feb. 27, 2014

(51) Int. Cl.
*H05K 5/00* (2006.01)
(52) U.S. Cl.
USPC ..... 174/50; 174/559; 361/679.01; 455/575.1; 312/223.1
(58) Field of Classification Search
USPC ............ 174/559; 361/679.01; 224/271; 455/575.1; 312/223.1; 345/173
See application file for complete search history.

(56) References Cited

U.S. PATENT DOCUMENTS

| | | | | |
|---|---|---|---|---|
| 5,800,028 | A * | 9/1998 | Smith et al. ............... | 312/223.1 |
| 6,646,864 | B2 | 11/2003 | Richardson | |
| 6,995,976 | B2 | 2/2006 | Richardson | |
| 7,158,376 | B2 | 1/2007 | Richardson | |
| 7,180,735 | B2 | 2/2007 | Thomas | |
| 7,230,823 | B2 | 6/2007 | Richardson | |
| 7,312,984 | B2 | 12/2007 | Richardson | |
| 7,449,650 | B2 | 11/2008 | Richardson | |
| 7,609,512 | B2 | 10/2009 | Richardson | |
| 7,663,879 | B2 | 2/2010 | Richardson | |
| 7,688,580 | B2 | 3/2010 | Richardson | |
| 7,759,575 | B2 * | 7/2010 | Jones et al. ................ | 174/50 |
| 7,889,489 | B2 | 2/2011 | Richardson | |
| 7,907,394 | B2 | 3/2011 | Richardson | |
| 7,933,122 | B2 | 4/2011 | Richardson | |
| 8,331,083 | B2 * | 12/2012 | Chen et al. ................ | 361/679.1 |
| 8,342,325 | B2 | 1/2013 | Rayner | |
| 8,350,149 | B2 * | 1/2013 | Chen et al. ................ | 174/50 |
| 8,357,850 | B2 * | 1/2013 | Ye ........................... | 174/50 |
| 8,393,466 | B2 | 3/2013 | Rayner | |
| 8,526,180 | B2 | 9/2013 | Rayner | |
| 8,531,824 | B2 | 9/2013 | Rayner | |
| 8,531,834 | B2 | 9/2013 | Rayner | |
| 8,554,285 | B2 * | 10/2013 | Kim et al. ................. | 455/575.1 |
| 8,564,945 | B2 * | 10/2013 | Nakao et al. .............. | 361/679.3 |
| 8,570,718 | B2 * | 10/2013 | Gao ......................... | 361/679.01 |
| 2012/0261306 | A1 | 10/2012 | Richardson | |
| 2012/0314354 | A1 | 12/2012 | Rayner | |
| 2013/0043777 | A1 | 2/2013 | Rayner | |
| 2013/0077226 | A1 | 3/2013 | Rayner | |
| 2013/0088828 | A1 | 4/2013 | Rayner | |
| 2013/0092576 | A1 | 4/2013 | Rayner | |

OTHER PUBLICATIONS

US 8,508,926, 08/2013, Richardson (withdrawn)

* cited by examiner

Primary Examiner — Dhirubhai R Patel

(57) ABSTRACT

A case for housing and protecting an electronic device against moisture damage and contaminants is disclosed. The case includes a first member having a first planer section and a first perimetric wall formed thereon, and a second member having a second planer section and a second perimetric wall formed thereon. The first perimetric wall and the second perimetric wall are engaged forming an overlap and a sealing structure for a watertight seal. The sealing structure includes a mated ring and a ridge-to-groove interlock. The case further includes a plurality interface feature accesses, including an optical access, an audio access, a button, and at least one open access for electrical connection. The case provides a cover with a plug adapted to cover up the open electrical connection access to form a watertight seal.

20 Claims, 9 Drawing Sheets

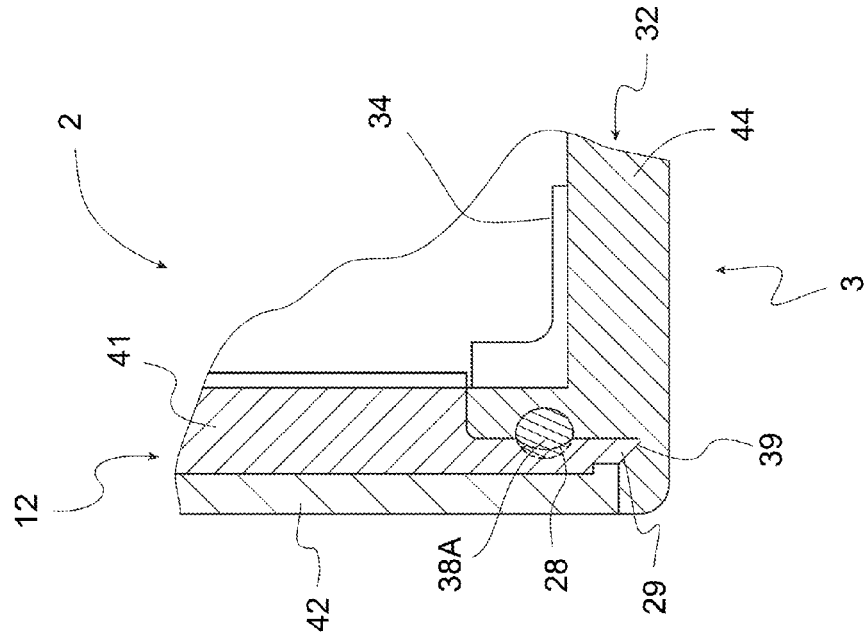
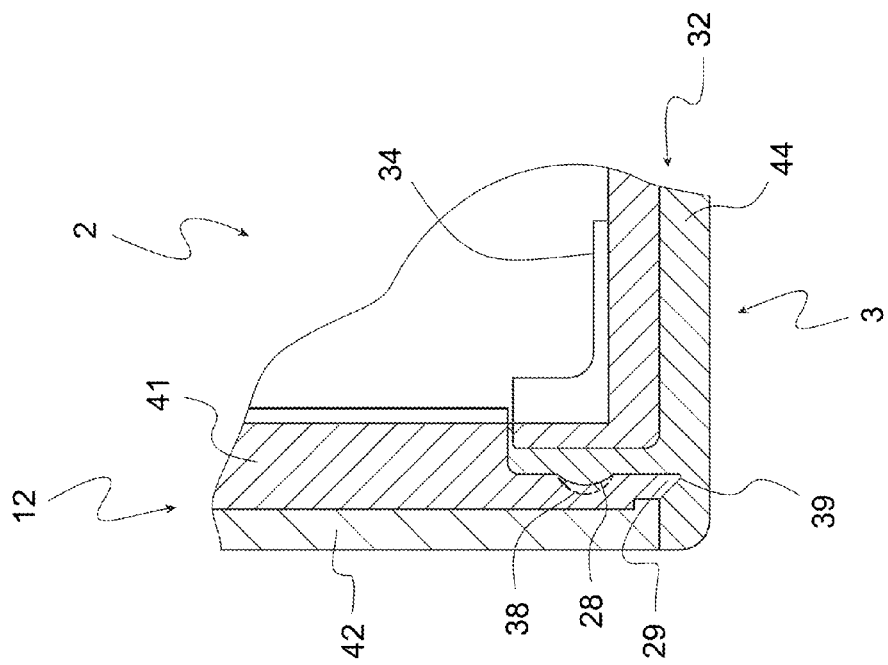

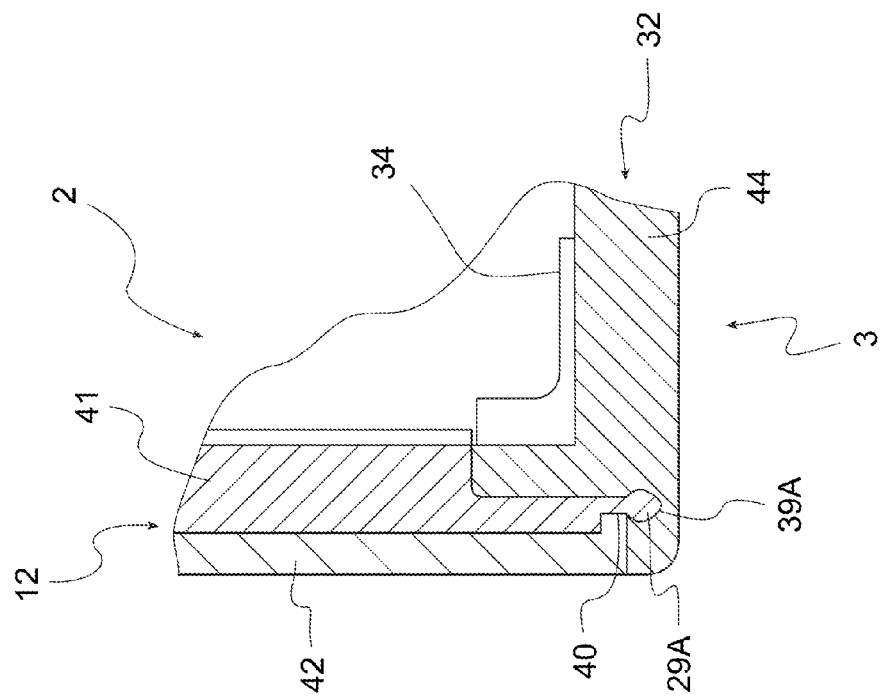

CASE FOR HOUSING AND PROTECTING AN ELECTRONIC DEVICE

FIELD OF THE INVENTION

The present invention relates generally to protection of electronic device, and more particularly to encasing and sealing electronic device against water and moisture damage.

BACKGROUND OF THE INVENTION

As CPU computing power improves continuously over the last decades, electronic devices are getting ever more powerful and smaller in size. Handheld or mobile devices are becoming more and more popular, and can perform more and more functions. There have emerged pagers, mobile or cellular phones, PDAs (personal digital assistants), MP3 players, digital cameras, smart phones, tablet computers, and etc. Typically, a handheld electronic device has a digital display to show text, image or video, and a speaker to play music or voice. It also has buttons or a keyboard either physically or on the display as a touchable screen to interface with a user, and realizes functions such as transferring voice or text message, playing music or video, taking pictures or recording video, accessing email or doing web browsing. Handheld electronic devices have dramatically changed people's lifestyle in the last couple of decades.

Because of their mobile nature, handheld electronic devices are subject to mechanical damages due to dropping, hitting, or scratching, and environmental conditions, such as exposing to water or moisture, and collecting dust, dirt, grease or stain. It is therefore desirable for a user to protect his or her device to avoid these damages.

Apparatuses have been designed to protect handheld electronic devices against shock and other mechanical damages. U.S. Patent Application Publication, Pub. No. 2011/0309728 A1, filed by Markus Diebel on Jul. 30, 2010, discloses a case for an electronic device having a lower case portion and an upper case portion assembled together to protect an electronic device. The case effectively protects the edges and the back side of the encased electronic device. However, the front side of the device with display is open and has limited protection. U.S. Patent Application Publication, Pub. No. 2011/0266291 A1, filed by Eagle Fan on Apr. 29, 2010, teaches a protective cover for protecting an electronic device, having a cover base and a protective lid. The protective lid can be engaged with the cover base to enclose the electronic device in order to protect the front display from damage. When the protective lid is disengaged from the cover base, the front side is open and the display is exposed so that the electronic device can be conveniently used.

However, the apparatuses disclosed in U.S. Pub. No. 2011/0309728 A1 and U.S. Pub. No. 2011/0266291 A1 do not seal off the encased electronic devices. As such, water or moisture can easily get through the cases and enter into the electronic devices to cause damages, including electrical short and corrosion. Also contaminants, such as dust, dirt, grease, and stain can easily cling on to the devices, and especially the exposed display and buttons. Further, lack of protection against water and moisture can limit the utility of the encased electronic device. For example, a user is prohibited from using an electronic device held in such covers to take a picture or record a video under water. And during a rainy day one has the tendency to hide his or her device in a bag or pocket due to the concern that water can enter into the device and cause electrical damage.

Therefore, there is a need to develop a case to house a handheld electronic device with a watertight seal so that the electronic device is prevented from collecting water, moisture, and other contaminants from the environment. It is desirable that such a case also brings the benefit of preventing the encased electronic device from mechanical damages such as shock or scratch. Furthermore, it is imperative that the case facilitates regular day-to-day operations of the encased electronic device at accepted performances.

SUMMARY OF THE INVENTION

It is therefore an object of the invention to provide a case to house an electronic device so that the electronic device is sealed off from the environment to prevent damages due to water, moisture and other contaminants. The case allows normal transmission of wireless radio waves in and out of the encased electronic device. It provides sealed interface feature accesses, including transparent windows for display and camera to properly work, ports for audio waves to pass through, buttons for operations of the device, and ports for electrical connections to establish without compromising the watertight seal. In addition, the case also provides basic protection against mechanical damages from shock or scratch.

According to one aspect of the invention, the case comprises a first member including a first planer section with a first perimetric wall formed thereon, and a second member including a second planer section with a second perimetric wall formed thereon. The first perimetric wall and the second perimetric wall are engaged together forming an overlap with an outer overlap layer extended from the first perimetric wall and an inner overlap layer extended from the second perimetric wall. The overlap has a dimensional interference around the perimeter caused by an outer dimension of the inner overlap layer being greater than a corresponding inner dimension of the outer overlap layer. The dimensional interference causes compression to the inner overlap layer and the outer overlap layer to form a watertight seal to separate the internal space of the case from the external.

According to another aspect of the invention, a ridge formed at the edge of the first perimetric wall is engaged with a groove at the perimeter of the planer section, forming an interlock. The ridge has a neck portion and a head portion that is thicker than the neck portion; and the groove has an entrance portion and an inner pocket portion that is wider than the entrance portion. The ridge is oversized as compared to the groove. As such, when the ridge is inserted into the groove for engagement, a tight interlock is established and a watertight seal is formed to separate the internal space of the case from the external.

According to yet another aspect of the invention, there is at least one open port formed on an edge of the case adapted to provide access to connect the encased electronic device to external electronic devices. The port has a protruding ring at its inner surface. When the port is plugged by a cover having a plug and a recessed ring on the outer surface of the plug, the protruding ring and the recessed ring are mated with a designed-in dimensional interference that causes compressive forced on the protruding ring and the recessed ring and therefore a watertight seal.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

FIG. 6 is a partial cross-sectional view of the case in FIG. 1 showing an embodiment of the perimetric wall overlap with a ringed watertight sealing engagement;

FIG. 7 is a partial cross-sectional view of the case in FIG. 1 showing another embodiment of the perimetric wall overlap with an alternative ringed watertight sealing engagement;

FIG. 8 is a partial cross-sectional view of the case in FIG. 1 showing an embodiment of the perimetric wall overlap with a ridge-to-groove interlock structure to achieve a watertight seal;

FIG. 9 is a partial cross-sectional view of the first member showing a phone jack access and a protruding ring formed on the internal channel surface of the phone jack access;

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
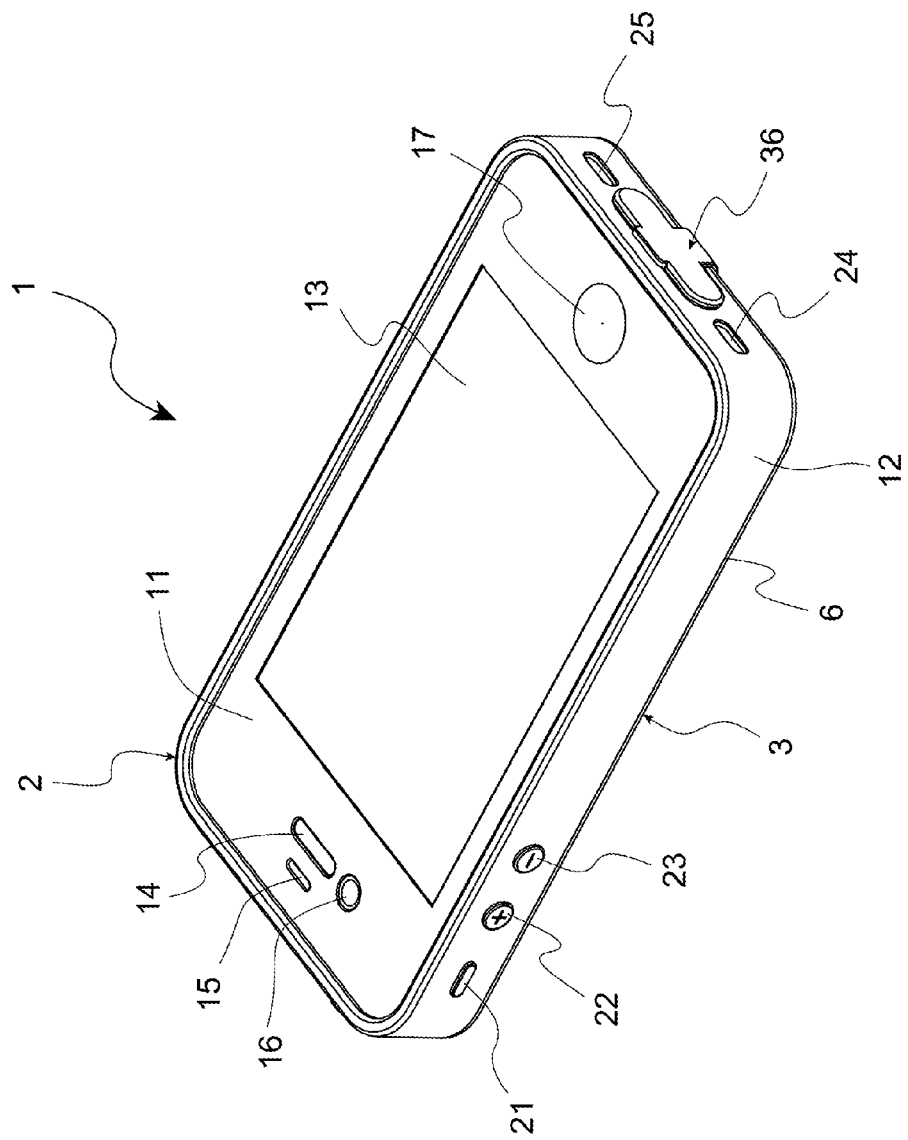
FIG. 1 is a perspective view of a case with a first member and a second member assembled to house an electronic device inside, and with sealed interface feature accesses.

Referring to FIG. 1, an embodiment of a case 1 is shown to comprise a first member 2 having a first planer section 11 and a first perimetric wall 12 formed thereon, and a second member 3 having a second planer section 31 (FIG. 3) and a second perimetric wall 32 (FIG. 3) formed thereon. First member 2 and second member 3 of case 1 are assembled together to form an internal enclosure that is capable of housing a handheld electronic device for protection. The assembly of first member 2 and second member 3 enables a watertight seal, and forms a seam line 6 that is close to second planer section 31, as shown in FIG. 1. Case 1 further comprises a plurality of interface feature accesses for a user to operate and utilize the electronic device housed therein, including a sealed display window 13, sealed buttons 17, 21, 22 and 23, sealed optical or audio accesses 14, 15, 16, 24 and 25, and open accesses for electrical connection 26 (FIG. 3) and 27 (FIG. 9). All the interface feature accesses are located on first member 2. But, their locations are determined by the interface features on the electronic device housed within the case, and can be distributed on first member 2 and second member 3 at different surfaces or edges. FIG. 1 shows that a dock connector access cover 36, attached to second member 3, covers a dock connector access 26 (FIG. 3) on first perimetric wall 12 to form a watertight seal. The structure and function of the watertight seal will be further delineated in a later section.

Figure 2:
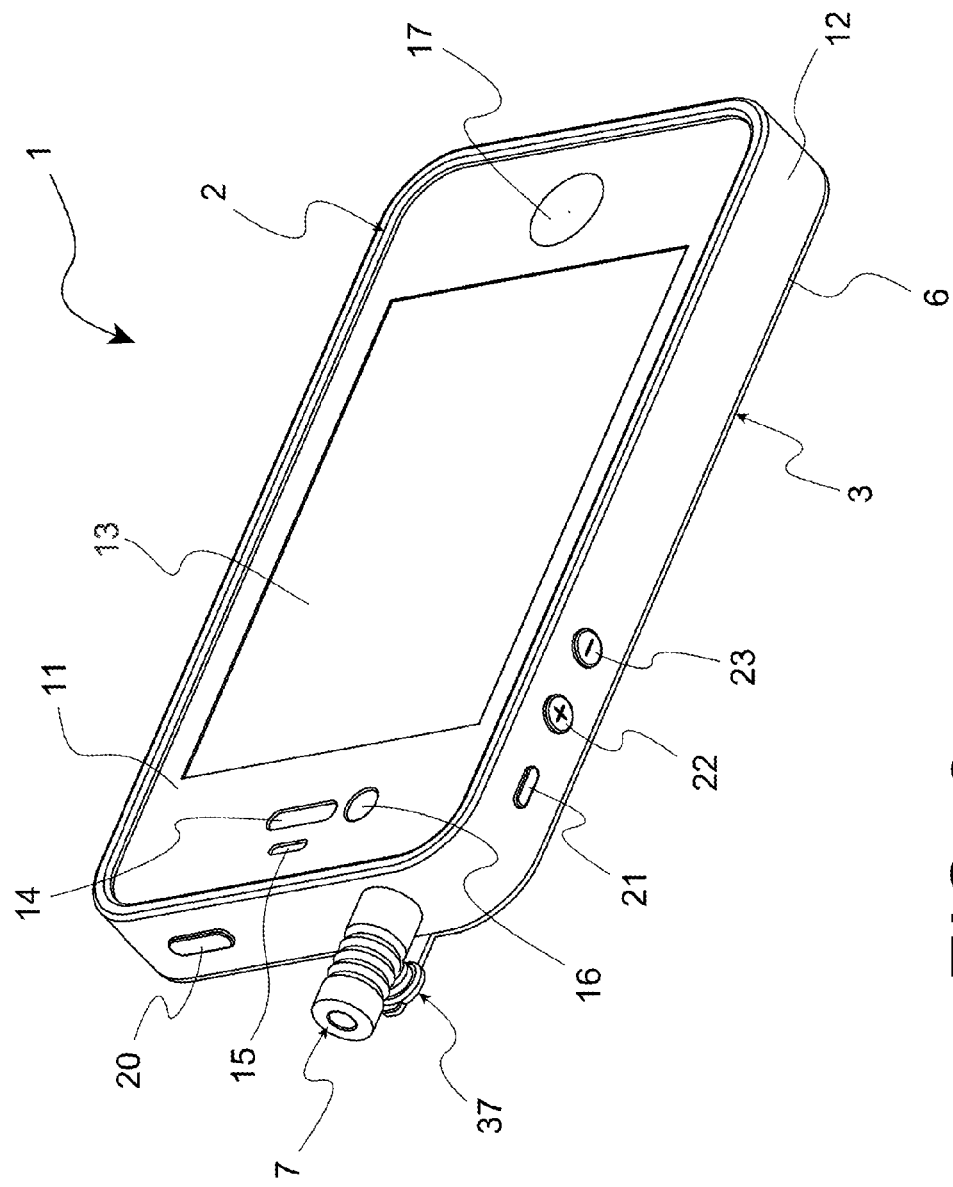
FIG. 2 is another perspective view of the case in FIG. 1 but with a phone jack access open to receive an phone jack adaptor that is capable of connecting to an external audio device.

FIG. 2 is the embodiment shown in FIG. 1 viewed from a different angle, revealing one more sealed button 20 for the operation of the housed electronic device and a phone jack access cover 37 attached to second member 3. However, phone jack access cover 37 is unplugged from phone jack access 27 (FIG. 9), and phone jack access 27 is instead plugged by a phone jack adaptor 7 that is adapted to make electrical connection to the housed electronic device and to provide electrical connection access to external audio equipment, such as a headphone or a stereo speaker. When plugged, a watertight seal is formed between phone jack adapter 7 and phone jack access 27 to prevent water, moisture or other contaminants from entering into the case.

Figure 3:
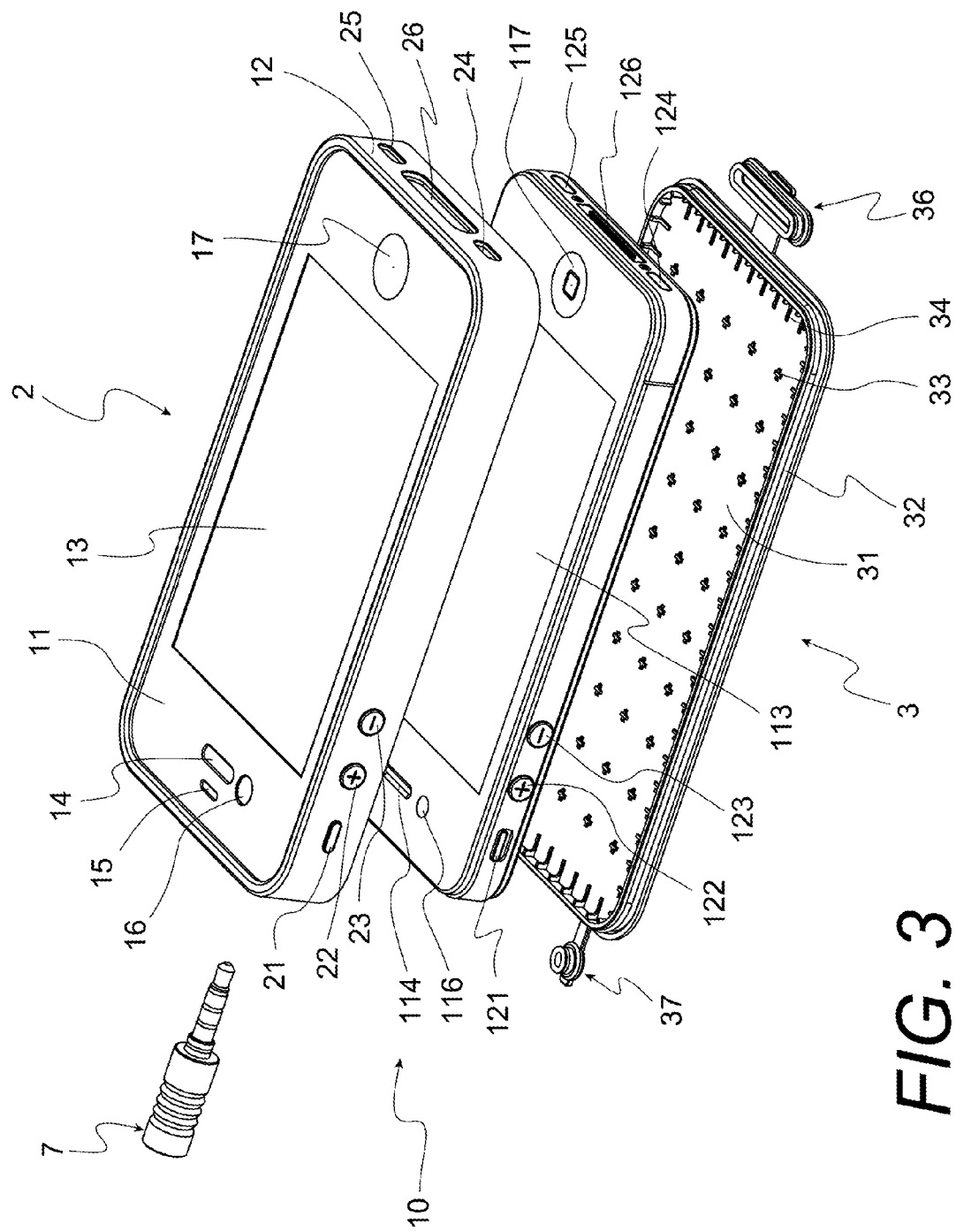
FIG. 3 is an exploded perspective view of FIG. 2, showing the case including the first member, the second member and the phone jack adaptor, together with the electronic device housed therein when the case is assembled.

In FIG. 3, an exploded view of FIG. 2, components of case 1 are shown unattached to each other, together with a handheld electronic device 10, in order to delineate the features on case 1 and the relationships among the components. The interface feature accesses on case 1 are so designed and positioned that normal operations of the corresponding interface features on electronic device 10 are facilitated. These interface feature accesses on case 1 can be categorized into at least 4 types, optical or light transmission, audio transmission, button/switch for operation, and electrical connection. When first member 2 and second member 3 of case 1 are assembled with electronic device 10 housed therein, display window 13 formed on first planer section 11 of first member 2 is placed on top of display 113 of electronic device 10, allowing lighted text, graphics, image or video to transmit through display window 13 so that an observer can normally view it. Therefore display window 13 is preferably a thin film or thin plate transparent to visible light. Camera access 16 on first member 2 is also preferred to be a thin film or thin plate transparent to visible light to allow camera 116 on electronic device 10 to take normal quality photos or to record normal quality videos. Optical sensor access 15, on the other hand, may require transparency to infrared light and/or visible light, depending on the requirements of the optical sensor (not shown) on electronic device 10. The thin films or thin plates that form the light transparent elements of display window 13, camera access 16 and optical sensor access 15 may be made of plastic material, such as polyester (PET), polycarbonate (PC), polymethyl methacrylate (PMMA), and the like, or glass. Their thicknesses may be as thin as a fraction of a minimeter. They can be insert-molded with first member 2, or attached onto first member 2 with thermal staking, ultrasonic welding, vibration welding, adhesion, or other methods of attachment, so that a watertight seal is formed to separate the internal space of case 1 and the outside. As such, water, moisture or other contaminants such as dust, dirt, stain and grease are prevented from entering into the internal space of case 1 through these optical accesses.

Speaker access 14, microphone access 24 and speaker phone access 25 on first member 2 are audio accesses to allow audio waves to transmit through without perceivable sound quality degradation. For the purpose, the audio accesses include a diaphragm that allows audio waves to transmit but prevents water or moisture to go through. The diaphragm can be made of a Gore-Tex® type, another type of semi-permeable diaphragm, or a non-permeable thin film that can transmit audio waves, and can be insert-molded with first member 2, or attached onto first member 2 with thermal staking, ultrasonic welding, vibration welding, adhesion, or other methods of attachment, to ensure that a watertight seal is formed.

Dock connector access 26 and phone jack access 27 allow electrical connectors to go through case 1 and get connected to electronic device 10. As such electronic device 10 can be electrically connected to an electrical charger or other electronic devices, such as computer, a handheld device, headphone, loud speaker, television, and etc., that are external to case 1. When no electrical connection to external devices are needed, dock connector access 26 is plugged by dock connector access cover 36, and phone jack access 27 plugged by phone jack access cover 37. Both dock connector access cover 36 and phone jack access cover 37 have mating structures to engage with the corresponding structures inside dock connector access 26 and phone jack access 27 to ensure watertight seal. The details of the watertight sealing structures will be shown in details in conjunction with FIGS. 9-15.

Buttons 17, 21, 22 and 23 on first member 2 are to transfer mechanical forces, such as pushing or sliding forces, in order to fulfill the functions of corresponding buttons 117, 121, 122, and 123 on electronic device 10. Preferably, these buttons on first member 2 include structures that are designed to flex and are made of resilient rubber to facilitate the transfer of mechanical movement to the corresponding buttons on electronic device 10 with minimal efforts. The structures for the buttons in first member 2 can be molded, over-molded, or made in other proper means.

Although all the interface feature accesses on case 1, including those for light transmission, audio transmission, electrical connection, and buttons for mechanical movement transfer, are located on first member 2 as shown in FIGS. 1-3, one of ordinary skilled in the art will appreciate that the locations of these features are dependent on electronic device 10 housed within case 1 and can be located on either first member 2 or second member 3 at different surfaces or edges. Therefore, they can be located on different sections of first member 2 and second member 3, i.e., first planer section 11, first perimetric wall 12, second planer section 31 and second perimetric wall 32. The distribution of the interface feature accesses is also dependent on the design of case 1. For example, if seam line 6 is located close to the edge dividing first planer section 11 and first perimetric wall 12, buttons 20, 21, 22, and 23 in FIGS. 1-3 will be located on second member 3, and more specifically second perimetric wall 32.

Back to FIG. 3, second member 3 comprises second planer section 31 and second perimetric all 32, and further comprises supporting posts 33 and supporting ribs 34 to provide cushion to electronic device 10 so as to substantially reduce damage to electronic device 10 by damping out mechanical shock from hit or impact. Second perimetric wall 32 has a ringed sealing structure to mate with first perimetric wall 12 in order to achieve watertight seal when first member 2 and second member 3 are assembled.

Figure 4:
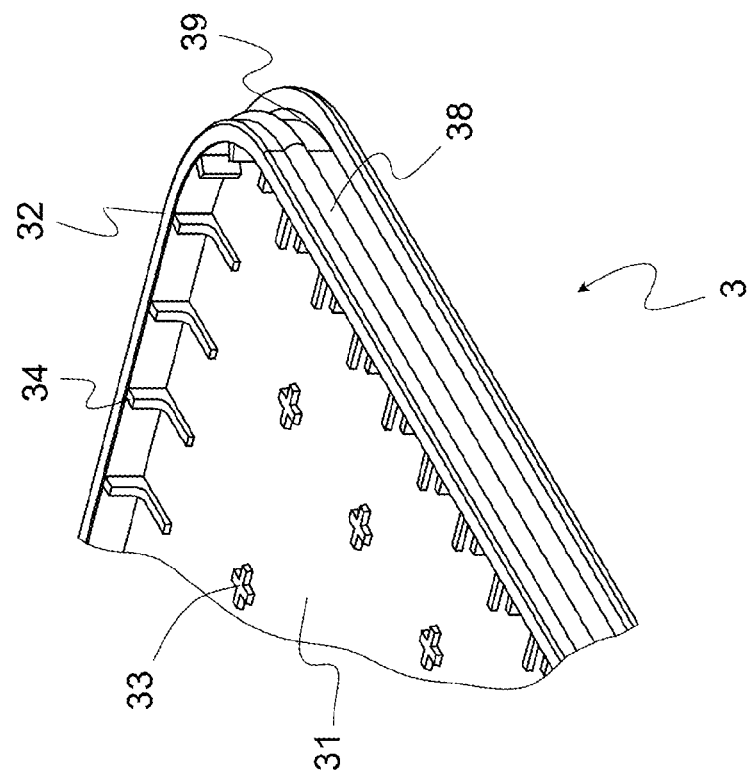
FIG. 4 is a partial perspective view of the second member of the case, showing the engagement and sealing structure.

The ringed sealing structure on second member 3 is revealed in FIG. 4, a partial perspective view to present more details, as a protruding ring 38 formed on the outer surface of second perimetric wall 32 and all the way around the perimeter. A second sealing feature is a groove 39 at the base of second perimetric wall 32 and into second planer section 31, which can cover full or partial length of the perimeter of perimetric wall 32.

Figure 5:
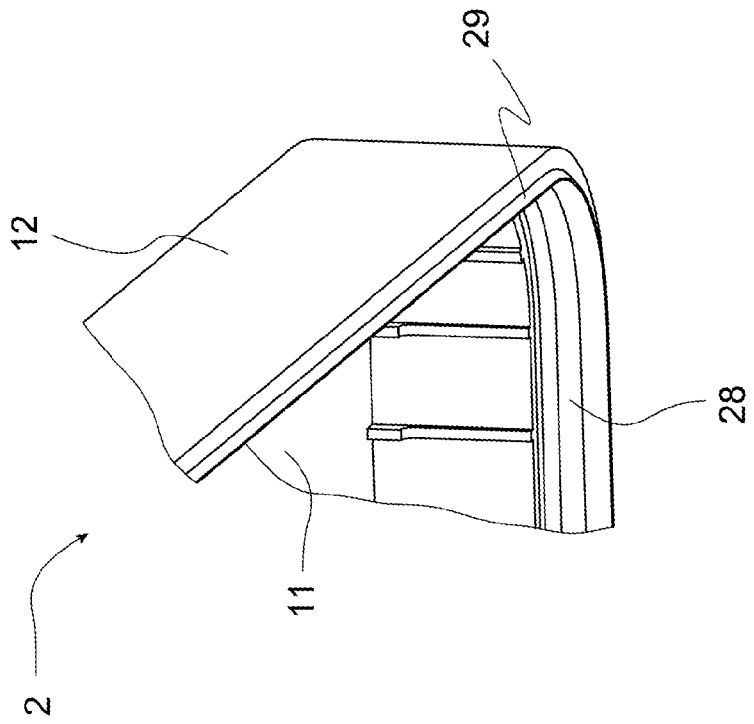
FIG. 5 is a partial perspective view of the first member of the case, showing the engagement and sealing structure.

FIG. 5 is a partial perspective view first member 2. As can be seen, a recessed ring 28 is formed on the inner surface of first perimetric wall 12, also around the perimeter, adapted to engage protruding ring 38 on second perimetric wall 32 in FIG. 4. And a ridge 29 on the edge of first perimetric wall 12 is able to fit into groove 39 of second member 3.

The sealing effect is achieved when second perimetric wall 32 on second member 3 is engaged with first perimetric wall 12 on first member 2. When the engagement happens, as shown in FIG. 6, an overlap is formed with an outer overlap layer extended from first perimetric wall 12 and an inner overlap layer extended from second perimetric wall 32. That is, second perimetric wall 32 is embraced by first perimetric wall 12 all around the perimeter. At the fully engaged position, protruding ring 38 on the outer side of second perimetric wall 32 mates into recessed ring 28 on the inner side of first perimetric wall 12. And, the ridge line of protruding ring 38 touches the corresponding valley line in the trough of recessed ring 28. However the overlap is designed in such a way that the outer dimension of the ridge on protruding ring 38 is greater than the dimension of the valley in the trough of recessed ring 28. That is, protruding ring 38 is intentionally oversized as compared to recessed ring 28, causing a dimensional interference. In FIG. 6, the dimensional interference is depicted by the area between the two arched lines, with the solid arch representing recessed ring 28 and the dashed arch representing protruding ring 38. The area defined between the two arches means that there is an amount of material on protruding ring 38 equal to the area that cannot be accepted by recessed ring 28. This dimensional interference exerts compressive forces on protruding ring 38 and recessed ring 28, and a tight fit is therefore achieved. It is preferred that both protruding ring 38 and recessed ring 28 are made of resilient rubber, such as thermal plastic polyurethane (TPU), silicone, florocarbon elastomer, or ethylene propylene diene monomer (EPDM), so that their shapes can change under compression force. Or, at least one of protruding ring 38 and recessed ring 28 is made of rubber for the purpose. The ability of shape conforming ensures a watertight seal between protruding ring 38 and recessed ring 28.

The compression forces caused by the dimensional interference described in the previous paragraph have the effect of flexing first perimetric wall 12 and second perimetric wall 32 to push them away from each other. As such, a gap can be formed between first perimetric wall 12 and second perimetric wall 32 at the overlap, undermining the sealing between protruding ring 38 and recessed ring 28. When electronic device 10 is encased in case 1, the inward flexing of second perimetric wall 32 can be limited by electronic device 10. Therefore, the effect of the compressive forces is that first perimetric wall 12 is flexed outward and a gap is formed between first perimetric wall 12 and second perimetric wall 32. In design of case 1, ridge 29 and groove 39 are created as an interlock to effectively eliminate the separation gap. In FIG. 6 when first perimetric wall 12 is covering over second perimetric wall 32 for engagement and just before protruding ring 38 mating into recessed ring 28, the tip of ridge 29 is slipped into groove 39. Because protruding ring 38 is pushing first perimetric wall 12 to flex outward and a gap exists between first perimetric wall 12 and second perimetric wall 32, ridge 29 is pushed outward and is not aligned with groove 39. And a force is required to push ridge 29 into groove 39 for full engagement. When full engagement between ridge 29 and groove 39 is achieved under force, the design does not allow any gap between first perimetric wall 12 and second perimetric wall 32 except some degree of bending of first perimetric wall 12. Therefore, full engagement pushes first perimetric wall 12 toward second perimetric wall 32, exerting more compressive forces on protruding ring 38 and recessed ring 28. Hence more ring shape conforming and better watertight sealing are achieved at the ringed sealing structure. Another benefit of the compressive forces is to keep protruding ring 38 and recessed 28 from slipping out of place. When first perimetric wall 12 and second perimetric wall 32 are pushed together for full engagement, recessed ring 28 receives protruding ring 38 like a snap-on feature. At the position, the whole structure of protruding ring 38, recessed ring 28, ridge 29 and groove 39 acts together for the best sealing and also structural stability. A certain amount of force is required to separate first member 2 from second member 3. And the amount of force required depends on the amount of dimensional interference between protruding ring 38 and recessed ring 28, and can be effectively designed.

It is preferred that both first member 2 and second member 3 in FIG. 6 are made by injection molding having two layers of different materials, i.e., the outer layer being resilient rubber, such as thermoplastic polyurethane (TPU) or silicone, the inner layer hard plastic, such as acrylonitrile butadiene styrene (ABS), polycarbonate (PC) or high impact polystyrene (HIPS), and the like. The softer and elastic outer layer provides a comfortable grip and gives shock absorbing ability to protect the electronic device housed internal of case 1 against mechanical damages, while the harder layer forms the rigidness of the case. For the overlapping structure shown in FIG. 6, protruding ring 38 can be injection molded the same time with wall section 44, both made of resilient rubber. Preferably, recessed ring 28 is molded the same time with wall section 41 from a hard plastic material. But, recessed ring 28 and wall section 41 can also be made of rubber or hard rubber.

FIG. 7 shows an alternative embodiment of the overlapping structure in FIG. 6. Instead of a protruding ring formed on the outer surface of second perimetric wall 32, an o-ring 38A is used. O-ring 38A is made of elastic rubber, such as florocarbon elastomer, silicone, ethylene propylene diene monomer (EPDM), or the like, and can be insert-molded with second member 3, or assembled after second member 3 is manufactured. In this embodiment, second perimetric wall 32 of second member 3 can be made of a single layer 44, preferable with hard plastic material.

Recessed ring 28 in FIGS. 5-7 can take different shapes as well. For example, it can have a simple flat belt shape. In this case, protruding ring 38 or o-ring 38A is pressing on a surface that is not concaved in the engagement direction. Therefore, there is no snap-on effect when first perimetric wall and second perimetric wall are assembled.

A variation of ridge to groove interlock is shown in FIG. 8, where ridge 29A has a neck portion and a head portion that is wider than the neck portion, as compared to the wedge shaped ridge 29 in FIG. 6. And the corresponding groove 39A has an entrance portion and an inner pocket portion that is wider than the entrance portion. Furthermore, ridge 29A is designed oversized as compared to groove 39A. When ridge 29A is forced into groove 39A, a tight interlock is formed because of the deformation of the groove structure caused by dimensional interference. As such, a watertight seal is established. The ridge-to-groove interlock shown in FIG. 8 can replace the corresponding structure in FIG. 6 and FIG. 7 to provide double sealing for optimal watertight effect.

One of ordinary skilled in the art will appreciate that more variations exist to the overlap and sealing structures shown in FIGS. 6-8. For example, the protruding ring/o-ring and recessed ring can switch places, i.e., the protruding ring or o-ring is located at the inner side of the outer layer of the overlap and the recessed ring at the outer side of the inner layer. Also, the outer overlap layer can be extended from second perimetric wall 32 of second member 3, and correspondingly the inner overlap layer can be extended from first perimetric wall 12 of first member 2. Although the overlap is shown located near second planer section 31, it can be located close to first planer section 11, or in the middle between first planer section 11 and second planer section 31. Or, the overlap can take a different orientation. For example, it can be located at the perimeter surrounding the edge that has audio accesses 24-25 and dock connector access 26. In this case, the edge having button 20 and phone jack access 27 becomes the first planer section and the first perimetric wall includes the back side, the long edges including the one having buttons 21, 22 and 23, and the front side of case 1. In the case of the ridge-to-groove interlock shown in FIG. 8, one alternative embodiment is that second perimetric wall 32 is eliminated, so that ridge 29A is interlocked into 39A without an inner overlap layer. Furthermore, different materials can be used. For example, metal can be used as the hard material layer for case rigidity and as the outer layer of the case for appealing appearance.

Turn to FIG. 9, a partial cross-sectional view to reveal the internal structure of phone jack access 27 on first perimetric wall 12 of first member 2. In the middle of the phone jack access channel there is a protruding ring 51 formed around the internal surface. Preferably, protruding ring 51 and the internal surface of phone jack access 27 are molded together with outer layer 42 of first member 2 and are made of resilient rubber material.

Figure 10:
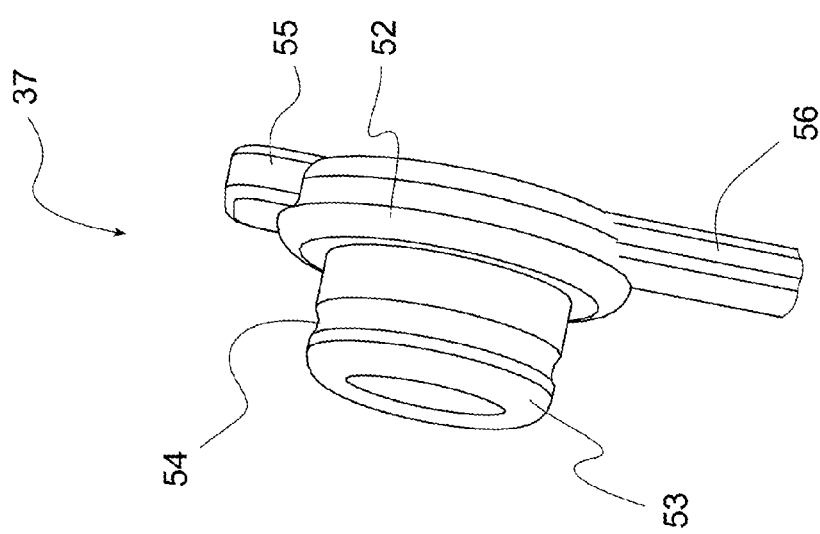
FIG. 10 is a perspective view of a phone jack access cover with a plug and a recessed ring formed on the outer surface of the plug.

FIG. 10 is a perspective view of phone jack access cover 37 that is attached to second member 3 through connection 56. Phone jack access over 37 can be made in the same mold of second member 3 by injection molding so that connection 56 is naturally formed. However, cover 37 can also be a standalone piece. Cover 37 has a base 52 and plug 53, and a recessed ring 54 formed on plug 53, as shown in FIG. 10. When plug 53 is inserted into phone jack access 27 to seal up the access, cover base 52 helps stop and position the insertion. And grip 55 helps the user to grab hold and pull phone jack access cover 37 to unplug the access when needed.

Figure 11:
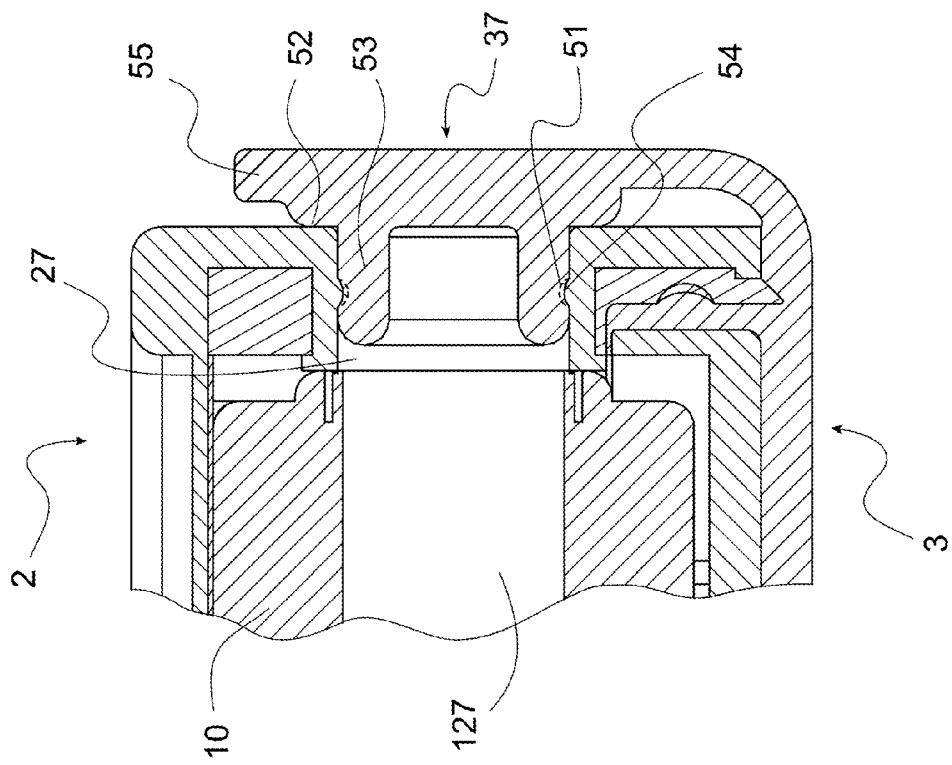
FIG. 11 is a partial cross-sectional view of the case in FIG. 1 showing one embodiment of the ringed sealing engagement of the phone jack access in FIG. 9 when plugged by the phone jack access cover in FIG. 10.

FIG. 11 is a partial cross-sectional view of case 1 when phone jack access 27 is plugged by phone jack access cover 37. In FIG. 11, first member 2 and second member 3 are assembled to house electronic device 10, with phone jack port 127 on electronic device 10 aligned with phone jack access 27 on first member 2 of case 1. When there is no need to connect electronic device 10 to an external audio device, such as a headphone or a stereo speaker, phone jack access 27 can be plugged and sealed by phone jack access cover 37. Plug 53 is inserted into phone jack access 27 by pushing phone jack access cover 37. And, full engagement is ensured when the insertion is stopped by cover base 52. At the position recessed ring 54 on plug 53 is mating with protruding ring 51 on the inner surface of jack access 27. Protruding ring 51 and recess ring 54 are constructed to cause a dimensional interference, i.e., the diameter of recessed ring 54 as measured in the deepest valley is greater than the diameter of protruding ring 51 as measured at the tallest ridge. The dimensional interference is indicated by the two arched lines in FIG. 11, where the dashed arch represents protruding ring 51 and solid arch represents recessed ring 54. Similar to the configuration discussed with FIGS. 6-8, dimensional interference causes compressive forces to exert on protruding ring 51 and recessed ring 54. However, in the direction of the forces, the structure of the engagement does not allow bending to occur unlike the case in FIG. 6 when the outer overlap layer is flexed outward under compressive force from protruding ring 38. Therefore, it is preferred that at least one of recessed ring 54 and protruding ring 51 is made of resilient rubber, so that under compression the elastic rubber can change dimension and conform to shape. In this way, a watertight seal is formed to separate the inner space of case 1 from outside. Another benefit of the engagement of protruding ring 51 to recessed ring 54 is a snap-on effect. As such phone jack access cover 37 does not easily slip out of the access channel.

Figure 12:
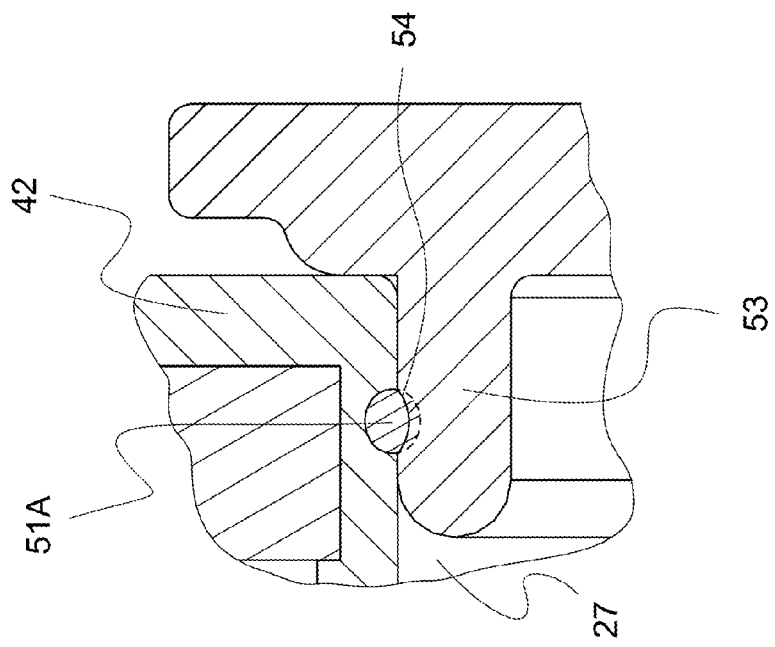
FIG. 12 is a partial cross-sectional view of the case in FIG. 1 showing an alternative embodiment of the ringed sealing engagement of FIG. 11.
Figure 13:
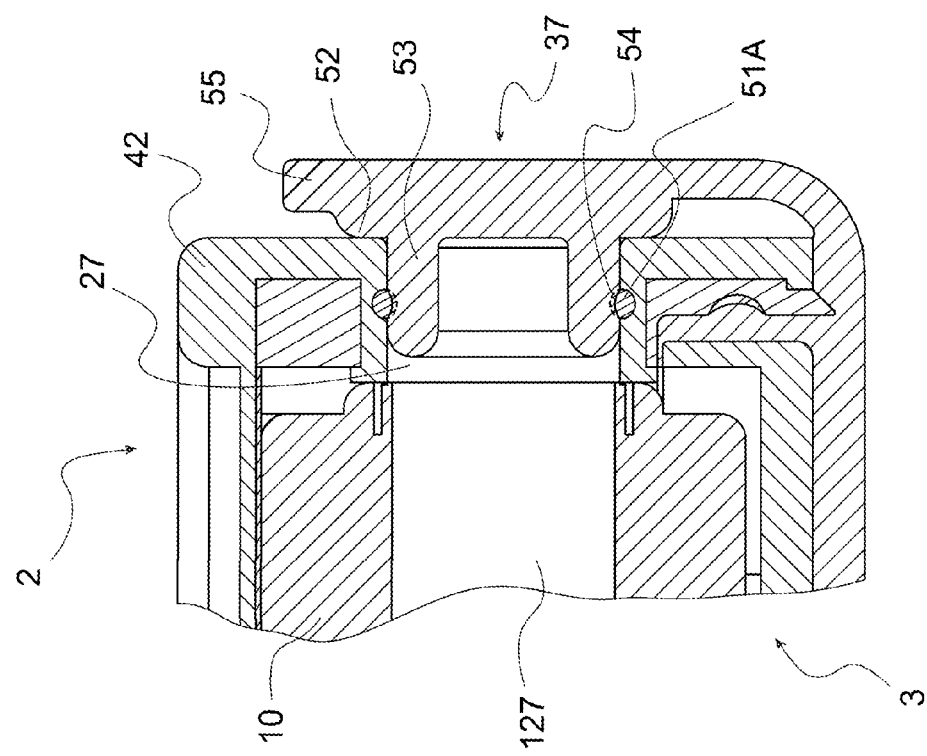
FIG. 13 is a close-up partial cross-sectional view of the ringed sealing engagement in FIG. 12.

FIG. 12 provides an alternative embodiment of protruding ring 51. Instead of a protruding ring formed on the inner surface of phone jack access 27, an o-ring 51A is used and is positioned in place by insert molding or assembly after first member 2 is manufactured. FIG. 13 is a close up view of FIG. 12 to reveal more details of o-ring 51A and its surroundings. It is preferred that o-ring 51A is made of resilient rubber, such as florocarbon elastomer, silicone, ethylene propylene diene monomer (EPDM), and etc. And, the surrounding material of o-ring 51A, i.e., outer layer 42 of first member 2, can be made of a hard plastic or metal.

Figure 14:
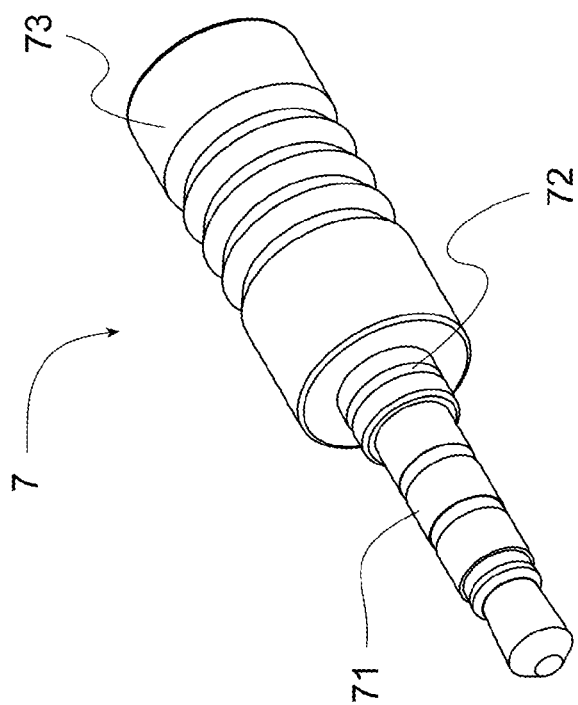
FIG. 14 is a perspective view of a phone jack adaptor with a metal connector, a recessed ring for watertight seal when engaged with the phone jack access, and a receiver adapted to provide electrical connection to an external audio device.

FIG. 14 is a perspective view of phone jack adaptor 7, which has a connector 71 and a receiver 73 adapted to connect to an external audio device, such as a headphone, a pair of ear buds, or a stereo loudspeaker. When there is need to connect electronic device 10 housed in case 1 to an external audio device, phone jack access cover 37 is unplugged to allow phone jack access 27 on first member 2 open. Then, phone jack adapter 7 is inserted through phone jack access 27 into phone jack port 127 on electronic device 10. Adaptor 7 has a recessed ring 72, with the same structure as recessed ring 54 on phone jack access cover 37, to mate with protruding ring 51 in phone jack access 27. It is preferred that the outer layer of phone jack adaptor 7 is made of resilient rubber so that recessed ring 72 can conform to shape under compressive force. When adapter 7 is fully inserted into phone jack port 127 through phone jack access 27, recessed ring 72 and protruding ring 51 are fully engages. The same with discussion in conjunction with FIG. 11, a dimensional interference between recessed ring 72 and protruding ring 51 causes the two components to conform to shape. As such, a watertight seal is formed to separate the internal space of case 1 from outside. And the engagement of protruding ring 72 and recessed ring 51 functions as a snap-on feature to hold phone jack adaptor 7 in place.

Figure 15:
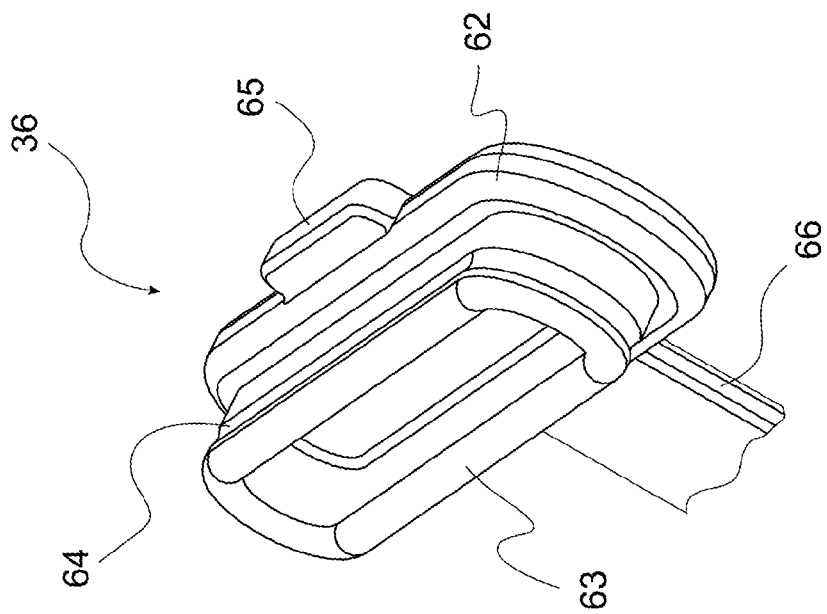
FIG. 15 is a perspective view of a rounded rectangular shaped dock connector access cover with a plug and a recessed ring formed on the outer surface of the plug. The cover is adapted to cover up a dock connector access of the same shape and size on the case, forming a watertight seal.

Although the phone jack connector has a round cross-section, other electrical connectors can take different shapes. Therefore, electrical connection accesses on case 1 can take different shapes to facilitate different types of electrical connections to external electronic devices and with features to ensure watertight seal. FIG. 15 shows details of dock connector access cover 36, which is constructed to plug up and seal dock connector access 26 when dock connector port 126 on electronic device 10 is not in use. As can be seen, dock connector access cover 36 has a rounded rectangular shape to match the shape of dock connector access 26 on first member 2, since dock connector port 126 has a rounded rectangular shape. Similar to phone jack cover 37 shown in FIG. 10, dock connector access cover 36 has a base 62, plug 63, and a recessed ring 64 formed on the outer surface of plug 63. When plug 63 is inserted into dock connector access 26, cover base 62 helps position and stop the insertion. And grip 65 helps the user to grab hold and pull dock connector access cover 36 to unplug the access when needed. At full engagement, a watertight seal is formed between recessed ring 64 and a protruding ring formed on the internal surface of dock connector access 26 due to designed dimensional interference. And, the engagement also functions as snap-on feature to keep cover 36 from slipping out. Dock connector access cover 36 can be made in the same mold of second member 3 using injection molding so that connection 66 is naturally form. But, cover 36 can also be made a separate piece.

One of ordinary skilled in the art will appreciate that the sealing structure for electrical connection access may take different forms without departing the spirit of the disclosed invention. One example is that the protruding ring and the recessed ring can inter-change their positions. Taking the embodiment in FIG. 11, this means that protruding ring 51 is located on plug 53, and recessed ring 54 is on the inner surface on jack access 27. Also, recessed ring 54 can simply have a flat belt shape.

It is understood that the above-described invention is merely illustrative of the possible specific embodiments which may represent principles of the present invention. Other arrangements may readily be devised in accordance with these principles by those skilled in the art without departing from the scope and spirit of the invention.

The invention claimed is:

1. An apparatus adapted to house and protect an electronic device, the apparatus having a plurality of surfaces, comprising:
    a first member having a first planer section and a first perimetric wall formed thereon, the edge of the first perimetric wall forming a ridge, the first planer section and the first perimetric wall forming a plurality of the surfaces;
    a second member having a second planer section and a second perimetric wall formed thereon, the perimeter of the second planer section having a groove, the second planer section and the second perimetric wall forming a plurality of the surfaces;
    wherein the first perimetric wall and the second perimetric wall are separably engaged forming an overlap with an outer overlap layer extended from the first perimetric wall and an inner overlap layer extended from the second perimetric wall, the overlap having a first mating ring formed on the inner surface of the outer overlap layer and a second mating ring formed on the outer surface of the inner overlap layer mating with the first mating ring around the perimeter;
    wherein a dimensional interference is caused by a dimension of the second mating ring being greater than a corresponding dimension of the first mating ring; and
    wherein when the first member and the second member are engaged an interlock is formed by the ridge of the first perimetric wall biting into the groove at the perimeter of the second planer section to cause the outer overlap layer and the inner overlap layer of the overlap to compress each other.

2. An apparatus as recited in claim 1 wherein:
    the first mating ring is a recessed ring from the outer overlap layer and the second mating ring is a protruding ring from the inner overlap layer.

3. An apparatus as recited in claim 2 wherein:
    the protruding ring is an o-ring that is fit into a channel on the outer surface of the inner overlap layer.

4. An apparatus as recited in claim 1 wherein:
the first mating ring is a flat belt shaped ring on the outer overlap layer and the second mating ring is a protruding ring from the inner overlap layer.

5. An apparatus as recited in claim 1 wherein:
the first mating ring is a protruding ring from the outer overlap layer and the second mating ring is a recessed ring from the inner overlap layer.

6. An apparatus as recited in claim 5 wherein:
the protruding ring is an o-ring that is fit into a channel on the inner surface of the outer overlap layer.

7. An apparatus as recited in claim 1 wherein:
the first mating ring is a protruding ring, from the outer overlap layer and the second mating ring is a flat belt shaped ring on the inner overlap layer.

8. An apparatus as recited in claim 1, further comprising:
at least one sealed optical access formed through at least one of the plurality of surfaces to allow light to pass through;
at least one sealed audio access formed on at least one of the plurality of surfaces to allow audio waves to pass through;
at least one sealed button formed on at least one of the plurality of surfaces adapted to transfer mechanical movement to at least one button on the electronic device housed inside the apparatus;
at least one open access formed through at least one of the plurality of surfaces adapted to allow at least one electrical connector to connect the electronic device housed inside the apparatus;
at least one access cover having a plug adapted to plug into the open access; and
wherein the open access has an outer mating ring on its inner surface adapted to mate to an inner mating ring on an outer surface of the plug on the access cover, and wherein when the open access is plugged by the access cover a dimensional interference is caused by is dimension of the inner mating ring being greater than a corresponding dimension of the outer mating ring.

9. An apparatus as recited in claim 8 wherein:
the outer mating ring is a protruding ring on the open access and the inner mating ring is a recessed ring on the access cover.

10. An apparatus as recited in claim 8 wherein:
the outer mating ring is a recessed ring on the open access and the inner mating ring is a protruding ring on the access cover.

11. An apparatus as recited in claim 10 wherein:
the protruding ring is an o-ring that is fit into a channel on the outer surface of the plug of the access cover.

12. An apparatus as recited in claim 8 wherein:
the at least one sealed optical access includes a thin transparent plastic layer to transmit light.

13. A method for protecting an electronic device against moisture damage comprising:
enclosing the electronic device with a first member having a first planer section and a first perimetric wall formed thereon and a second member having a second planer section and a second perimetric wall formed thereon, the first member and the second member providing a plurality of surfaces;
forming an separable overlap with an outer overlap layer extended from the first perimetric wall and an inner overlap layer extended from the second perimetric wall, the overlap having a first mating ring formed on the inner surface of the outer overlap layer and a second mating ring formed on the outer surface of the inner overlap layer, the first mating ring and the second mating ring being engaged;
forming an interlock at the overlap by pressing a ridge on the edge of the first perimetric wall into a groove at the perimeter of the second planer section; and
causing a dimensional interference by a dimension of the second mating ring from the inner overlap layer being greater than a corresponding dimension of the first mating ring from the outer overlap layer to cause the outer overlap layer and the inner overlap layer to compress each other.

14. A method as recited in claim 13 wherein:
the interlock causes a snap-on between the first mating ring from the outer overlap layer and the second mating ring from the inner overlap layer.

15. A method as recited in claim 13 wherein:
the first mating ring is a recessed ring from the outer overlap layer and the second mating ring is a protruding ring from the inner overlap layer.

16. A method as recited in claim 15 wherein:
the protruding ring is an o-ring that is fit into a channel on the outer surface of the inner overlap layer.

17. A method as recited in claim 13 wherein:
the first mating ring is a protruding ring from the outer overlap layer and the second mating ring is a recessed ring from the inner overlap layer.

18. A method as recited in 13 further comprising:
allowing light to pass though at least one sealed optical access channel formed in at least one of the plurality of surfaces;
allowing audio waves to pass through at least one sealed audio access channel formed on at least one of the plurality of surfaces;
providing at least one sealed button on at least one of the plurality of surfaces to transfer mechanical movement to at least one button on the electronic device housed inside;
providing at least one open access channel through at least one of the plurality of surfaces to allow at least one outside electrical connector to connect to the electronic device housed inside, and
providing at least one access cover each having a plug adapted to plug into at least one of the open access, wherein the open access has an outer mating ring on its inner surface adapted to mate to an inner mating ring on an outer surface of the plug on the access cover, and wherein when the open access is plugged by the access cover a dimensional interference is caused by a dimension of the inner mating ring being greater than a corresponding dimension of the outer mating ring.

19. A method as recited in claim 13 wherein:
the first mating ring is a flat belt shaped ring on the outer overlap layer and the second mating ring is a protruding ring from the inner overlap layer.

20. A method as recited in claim 13 wherein:
the first mating ring is a protruding ring from the outer overlap layer and the second mating ring is a flat belt shaped ring on the inner overlap layer.

* * * * *